United States Patent
Diedrick et al.

(10) Patent No.: US 9,156,104 B2
(45) Date of Patent: Oct. 13, 2015

(54) PORTABLE WELDING WEARABLE WIRE FEED AND CONTROL SYSTEM AND METHOD

(75) Inventors: Michael G. Diedrick, Appleton, WI (US); Gregory C. Baeten, Kaukauna, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 1815 days.

(21) Appl. No.: 12/201,959

(22) Filed: Aug. 29, 2008

(65) Prior Publication Data

US 2010/0051595 A1    Mar. 4, 2010

(51) Int. Cl.
| | | |
|---|---|---|
| B23K 9/00 | (2006.01) | |
| B23K 9/12 | (2006.01) | |
| B23K 9/133 | (2006.01) | |
| B23K 9/173 | (2006.01) | |

(52) U.S. Cl.
CPC .................. *B23K 9/124* (2013.01); *B23K 9/125* (2013.01); *B23K 9/133* (2013.01); *B23K 9/173* (2013.01)

(58) Field of Classification Search
USPC .................................. 219/136, 137.2, 137.31
See application file for complete search history.

(56) References Cited

U.S. PATENT DOCUMENTS

| | | |
|---|---|---|
| D148,188 S | 12/1947 | Robert |
| 2,833,912 A | 5/1958 | Royer |
| 3,480,221 A | 11/1969 | Sekino |
| 4,182,949 A | 1/1980 | Powers |
| 4,465,920 A | 8/1984 | Hoyt |
| 4,508,954 A | 4/1985 | Kroll |
| D294,080 S | 2/1988 | Golia |
| 4,815,596 A | 3/1989 | Reid |
| D333,484 S | 2/1993 | Neumeister |
| 5,222,683 A | 6/1993 | Blackshire |
| D337,657 S | 7/1993 | March |
| D342,159 S | 12/1993 | Daouk |
| 5,307,979 A | 5/1994 | Kim |
| D357,263 S | 4/1995 | Soderholm |

(Continued)

FOREIGN PATENT DOCUMENTS

| | | |
|---|---|---|
| DE | 2811940 | 9/1979 |
| DE | 19855033 | 5/2000 |

(Continued)

OTHER PUBLICATIONS

U.S. Appl. No. 12/201,904, filed Aug. 29, 2008, Diedrick et al.

(Continued)

*Primary Examiner* — Dana Ross
*Assistant Examiner* — Ayub Maye
(74) *Attorney, Agent, or Firm* — Fletcher Yoder P.C.

(57) ABSTRACT

A welding system is provided that includes a wearable wire feeder. The wearable wire feeder includes a control unit configured to generate a control signal and a wire drive responsive to the control signal. Another welding system is provided that includes a wearable wire feeder that includes a wire drive, a circuit configured to control a welding parameter, and a battery coupled to the circuit, the wire drive, or a combination thereof. In another embodiment, a welding system is provided that includes a wire drive, a control unit configured to control the wire drive and a gas control configured to control flow of a gas. A method is also provided that includes generating a control signal within a wearable wire feeder and driving a welding wire within the wearable wire feeder in response to the control signal.

7 Claims, 4 Drawing Sheets

(56) References Cited

U.S. PATENT DOCUMENTS

| | | | |
|---|---|---|---|
| 5,403,133 A | 4/1995 | Kim | |
| D386,148 S | 11/1997 | Katooka | |
| 5,734,148 A | 3/1998 | Latvis | |
| D415,614 S | 10/1999 | Akaike | |
| D416,030 S | 11/1999 | Weller | |
| 6,225,596 B1 | 5/2001 | Chandler et al. | |
| D454,578 S | 3/2002 | Armbruster | |
| D462,519 S | 9/2002 | Gaydos | |
| 6,479,795 B1 | 11/2002 | Albrecht et al. | |
| D467,257 S | 12/2002 | Andersson | |
| D467,425 S | 12/2002 | Hardigg | |
| D472,384 S | 4/2003 | Richardson | |
| 6,855,914 B1 | 2/2005 | Kaufman | |
| 6,888,099 B1 | 5/2005 | Schneider | |
| 7,023,101 B2 | 4/2006 | Wang | |
| D520,237 S | 5/2006 | Cheng | |
| 7,049,545 B2 * | 5/2006 | Matus et al. | 219/130.21 |
| D523,242 S | 6/2006 | Hardigg | |
| 7,208,699 B2 | 4/2007 | Stranzel | |
| D611,074 S | 3/2010 | Bashore | |
| 2003/0052109 A1 | 3/2003 | Hayes | |
| 2004/0015258 A1 | 1/2004 | Hayes | |
| 2005/0016975 A1 | 1/2005 | Reynolds | |
| 2005/0067396 A1 | 3/2005 | Kaufman | |
| 2005/0224484 A1 * | 10/2005 | Matiash | 219/137.2 |
| 2006/0027546 A1 | 2/2006 | Reynolds | |
| 2006/0027547 A1 | 2/2006 | Silvestro | |
| 2006/0076335 A1 | 4/2006 | Reynolds | |
| 2006/0169685 A1 | 8/2006 | Stanzel | |
| 2006/0201923 A1 | 9/2006 | Hutchison | |
| 2006/0207981 A1 | 9/2006 | Diekmann et al. | |
| 2007/0108174 A1 | 5/2007 | Narayanan | |
| 2007/0158313 A1 | 7/2007 | Stanzel | |
| 2008/0047522 A1 | 2/2008 | Leisner | |
| 2008/0073330 A1 | 3/2008 | Diedrick et al. | |
| 2008/0078753 A1 * | 4/2008 | Fulcer et al. | 219/136 |
| 2008/0149611 A1 | 6/2008 | Roth et al. | |
| 2008/0156783 A1 | 7/2008 | Vanden Heuvel et al. | |
| 2010/0051595 A1 | 3/2010 | Diedrick | |

FOREIGN PATENT DOCUMENTS

| | | |
|---|---|---|
| GB | 2264924 | 9/1993 |
| WO | WO0076709 | 12/2000 |
| WO | WO2005107993 | 11/2005 |

OTHER PUBLICATIONS

Oxomatic 1; Admitted Prior Art; Date: unknown.
Oxomatic 2; Admitted Prior Art; Date: unknown.
Oxomatic 3; Admitted Prior Art; Date: unknown.
Glenn, R. "Broco Inc.'s Goweldo; Portable Mig Welder" Jul. 1, 2003. Internet document downloaded from http://www.off-road.com/ on Sep. 23, 2008. Paragraph 4, Photographs 1, 2, 3.
Millermatic Passport and M-10 Gun; Owner's Manual; OM-1328 220 073U; Miller.
Millermatic Passport and M-10 Gun; Owner's Manual; OM-1328 220 073L; Miller.
Miller Electric Mfg Co.,; Millermatic 140; www.Mil3erWelds.com; Issued Sep. 2006, Index No. DC/12.43.
Miller Electric Mfg Co.; SuitCase 8RC and 12RC; www.MillerWelds.com; Issued Jan. 2007, Index No. M/6.5.
Miller Electric Mfg Co.; Millermatic Passport; www.MillerWelds.com; Issued Feb. 2007, Index No. DC/12.53.

* cited by examiner

PORTABLE WELDING WEARABLE WIRE FEED AND CONTROL SYSTEM AND METHOD

BACKGROUND

The invention relates generally to portable welding systems. More specifically, embodiments of the invention relate to a wire feeder having the ability to control a welding system and various components integrally mounted inside a wearable unit.

Portable welding systems may be used in field applications where it is not practical or convenient to send a work piece to a welding shop for repair or fabrication. These welders find applications in the farming and ranching industry and in a variety of other settings. To provide the welding functionality, a welding wire feeder may be used to feed a welding wire through a torch to a molten weld location in front of the tip of the torch. In many applications, it may be desirable to move the wire feeder to a remote location or simply to a different location in a work area. Otherwise, the wire feeder may be required to drive the wire over an unnecessarily long run of conduit to the particular location. As a result, the wire feeder may require a more robust and expensive drive mechanism.

Unfortunately, conventional wire feeders are designed as stationary devices intended to remain within a particular work area. Additionally, portable wire feeders can be difficult or impossible to carry in areas requiring one or both hands of the user. Some wire feeders may be integrated into the welding torch, such as "push-pull" or "self-contained" wire feed torches. However, these wire feed torches may result in a bulky and heavy torch that is difficult to use to access welds in certain locations, and they may be up to 10 to 15 feet in length. The wire feed mechanisms and control circuitry in these guns may also add cost and manufacturing complexities.

Some portable wire feeders may rely on the welding system to provide gas, power, and control signals to the wire feeder. Unfortunately, these requirements reduce the portability of such wire feeders and restrict the compatibility of the wire feeders to specific welding systems.

BRIEF DESCRIPTION

In one embodiment, a welding system is provided that includes a wearable wire feeder that includes a control unit configured to generate a control signal and a wire drive a responsive to the control signal.

In another embodiment, a welding system is provided that includes a wearable wire feeder that includes a wire drive, a circuit configured to control a welding parameter, and a battery coupled to the circuit, the wire drive, or a combination thereof.

In another embodiment, a welding system is provided that includes a wearable wire feeder, a wire drive, a control unit configured to control the wire drive, and a gas control configured to control flow of a gas.

A method is provided that includes generating a control signal within a wearable wire feeder and driving a welding wire within the wearable wire feeder in response to the control signal.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
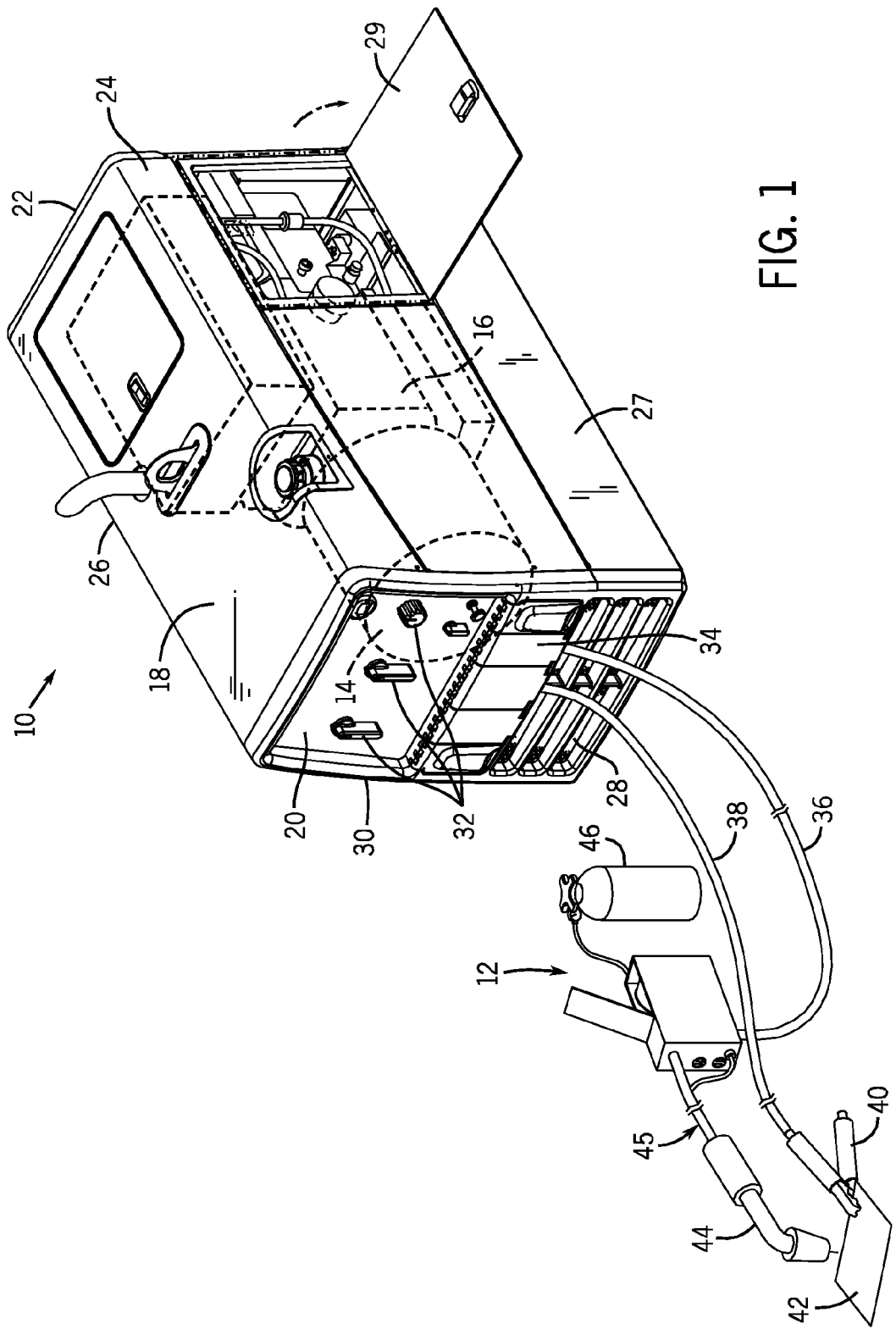
FIG. 1 is a perspective view of a universal wearable wire feeder coupled to a portable engine-driven welding system in accordance with an embodiment of the present invention.

FIG. 1 is a perspective view of an engine-driven portable power unit 10 coupled to a wearable wire feeder 12 in accordance with an embodiment of the present invention. The engine-driven portable power unit 10 includes an electrical power generator 14 that is coupled to and driven by an engine 16. In an embodiment, the engine 16 may include a combustion engine powered by gas or diesel, liquefied petroleum gas, natural gas, or other fuel. The engine 16 and generator 14 are fully enclosed by an enclosure 18. The enclosure 18 includes a front panel 20, a rear side 22, a right side 24, and a left side 26, all engaging a base 27 to complete the enclosure 18. The enclosure 18 protects the engine 16 and generator 14 form dust, debris, and rough handling. The enclosure may also include a cool air inlet 28 to help cool the engine 16 by preventing hot air recirculation by flowing ambient air through the interior volume of the enclosure 18. One or more of the panels of the enclosure 18 may be removable, such as a side panel 29, to allow access to interior components of the portable power unit 10.

The generator 14 may convert the power output (e.g., mechanical energy) of the engine 16 to an electrical power. Generally, the generator 14 includes a device configured to convert a rotating magnetic field into an electrical current (e.g., AC generator). The generator 14 includes a rotor (rotating portion of the generator) and a stator (the stationary portion of the generator). For example, the rotor of the generator 14 may include a rotating drive shaft disposed in a single stator configured to create an electrical current (e.g., welding current) from the rotation of the magnetic field. In an embodiment, the generator may include a four-pole rotor and three-phase weld output configured to provide beneficial welding characteristics. Further, the generator 14 may include a plurality of independent winding sections in the rotors and/or stators, such that the generator 14 is configured to output multiple electrical outputs having different characteristics. For example, the generator 14 may include a first section configured to drive a welding current to a welder and a second section configured to drive a current for other AC outputs.

As depicted, the front panel 20 includes a control panel 30 which may include various controls, inputs, indicators, displays, electrical outputs, air outputs, and so forth. In an embodiment, a control 32 may include a knob or button configured for a mode of operation, an output level or type, etc. For instance, the control 32 may include a dial rotatable to select a mode of operation, such as a DC weld, an AC weld, a battery charge, or a tool operation. Embodiments of the control panel 30 include any number inputs and outputs, such as welding methods, air compressor settings, oil pressure, oil temperature, and system power.

The illustrated system 10 also includes various receptacles 34. The receptacles 34 may include various outlets and couplers configured to provide access to the electrical power and the compressed air generated by the system 10. For example, the illustrated receptacles 34 may include an AC power output and a DC power output. In an embodiment, these outputs are coupled to various devices and tools. For example, the portable power unit 10 may be coupled to the universal wearable wire feeder 12 via a power cable 36. The portable power unit 10 also may be coupled to a ground cable 38 having a ground clamp 40, which may be attached to a work piece 42. The power cable 36 is coupled to the wearable wire feeder 12, which in turn is coupled to a welding torch 44 via a torch cable 45. The torch 44 may include a variety of wire for torches, such as a metal inert gas (MIG) welding gun. In one embodiment, the power cable 36 may be about 15 to about 50 feet, and the welding torch 44 and cable 45 may be about 3 to 5 ft. In operation, a welding operator contacts an electrode in the welding torch 44 with the work piece 42 to complete an electrical circuit and thereby to create an arc used to melt metal and perform the welding operation.

The close proximity of the wearable wire feeder 12 to the operator (i.e., mounted on operator), the torch 44, and the weld location enables the operator more freedom to weld at remote locations. The short distance between the wire feeder 12 and torch 44 also enables use of smaller welding wire, a smaller wire feed drive, and so forth. The short distance of the cable 45 reduces the weight associated with the cable 45. Further, there is less weight in the power/control cable 36 because it does not include welding wire. Additionally, the welding operation is not limited to the position of the wire feeder 12, because the wire feeder 12 is always with the operator As mentioned above, the wearable wire feeder 12 is coupled to the portable power unit 10 by the power cable 36. As described in more detail below with reference to FIG. 3, the power cable 36 may supply power to the wearable wire feeder 12. The gas supply, wire feed control, and contactor control may be controlled by and/or incorporated into the wearable wire feeder 12. In this embodiment, the wearable wire feeder 12 may rely on the portable power unit 10 only for a constant voltage power source for the arc voltage. In certain embodiments, any power source capable of supplying this voltage may be used with the wearable wire feeder 12, as no additional power, signals, or outputs are needed by the feeder 12. In other words, the feeder 12 may be a standalone unit having a power supply, such as a battery, to power wire drive, and various controls for operation independent of the power unit 10 and torch 44. Thus, the wearable wire feeder 12 may also use power from the system 10 to charge the battery and/or power in the wire drive disposed in the feeder 12. In other embodiments, the feeder 12 may not have a self-contained power supply (e.g., battery) and/or it may rely on external power when available.

The wearable wire feeder 12 may also be coupled to a gas source, such as a gas cylinder 46, to provide shielding gas for the welding operation. Advantageously, to facilitate portable welding in small locations, a user may wear the wearable wire feeder 12 as a fanny pack, a shoulder pack, etc., thus freeing both of the user's hands. The wire feeder 12 may be mounted to a user's belt, thigh, shoulder, or any other location by straps, loops, clasps, or any suitable mounting mechanism. The gas cylinder 46 is coupled to the wearable wire feeder 12, so it may also be worn with the wire feeder 12, providing the user with a portable source of shielding gas for the welding operation. In one embodiment, the gas cylinder 46 may be a $CO_2$ canister. In other embodiments, the gas cylinder may be any suitable gas and/or storage container.

Figure 2:
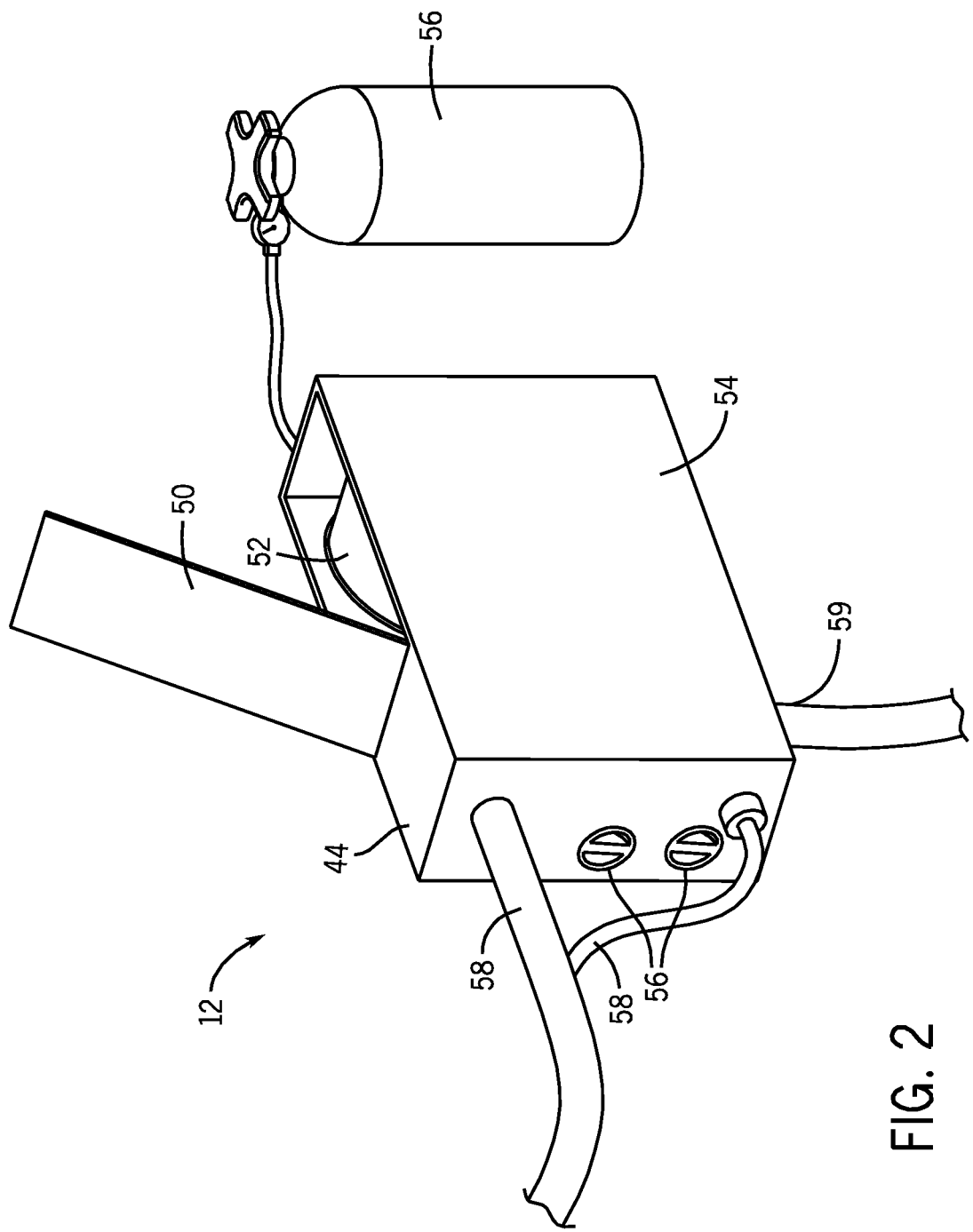
FIG. 2 is a perspective view of the universal wearable wire feeder of FIG. 1 in accordance with an embodiment of the present invention.

Turning now in more detail to the wire feeder 12, FIG. 2 depicts a perspective view of the wire feeder 12 having a top panel 50 that is open to expose a wire spool 52. The top (or side) panel 50 may be hinged or otherwise removable to allow insertion and removal of the wire spool 52. In one embodiment, the wire feeder 12 may be configured to receive up to about a 2 lb wire spool. The top panel 50 may be secured to a housing 54 of the wire feed 12 by a mechanical or magnetic clasp, a lock, or any suitable mechanism. In one embodiment, the housing 54 may be manufactured from molded plastic. In other embodiments, the housing 54 may be manufactured from a composite or any other suitable material. For example, in an embodiment the housing 54 may be made entirely or consist essentially of plastic, composite, carbon fiber, fiberglass, other non-metallic materials. In other embodiments, the housing 54 may consist essentially of a combination of materials, such as plastic and composites, plastic and other nonmetallic materials, etc. In one embodiment, the universal wearable wire feeder 12 including the wire spool 52, the housing 54, a battery, a gas solenoid valve, and other components described below may weigh up to 10 lbs.

The housing of the wire feeder 12 may also include one or more user inputs, such as controls or dials 56, which may allow a user to control the arc contactor, the gas supply, the wire feed speed, voltage, or any other welding parameter. For example, the dials 56 may include wire speed, gas flow rate, welding current, and so forth. In addition to the dials 56, the wire feeder 12 may include other control features, such as switches, keypads, and displays. The displays may include digital and/or analog displays of wire speed, gas flow rate, welding current, and so forth. Thus, once a power unit is available and outputting power, a user may be able to control all parameters of the welding operation from the wire feeder 12 using the controls 56. In certain embodiments, the wire feeder 12 does not rely on control circuitry or control signals external to the wire feeder 12, e.g., from power unit 10, a control a long cable 36, etc.

The front of the wire feeder may also include one or more connections 58 to the welding torch 34. The wire feeder 12 may also include a connection 59 to the power cable 36 that couples the wire feeder 12 to the portable power unit 10.

The gas cylinder 46 may be secured to the housing 54 of the wire feeder 12, so that use of the gas cylinder 46 with the wire feeder 12 does not affect the portability of the wire feeder 12. The gas cylinder 46 may be secured to the housing 54 of the wire feeder 12 via brackets, clips, screws, and/or any suitable attachment mechanism or combination thereof. In other embodiments, the gas cylinder 46 may be mounted inside the housing 54, such as a gas cylinder 46 is an internal to the wearable wire feeder 12. And yet other embodiments, the gas cylinder 46 may be mounted directly to the user (i.e., wearable) separate from the wire feeder 12. For example, the gas cylinder 46 may be mounted on a user's back and/or on a user's front waist to help distribute the load on the user.

Figure 3:
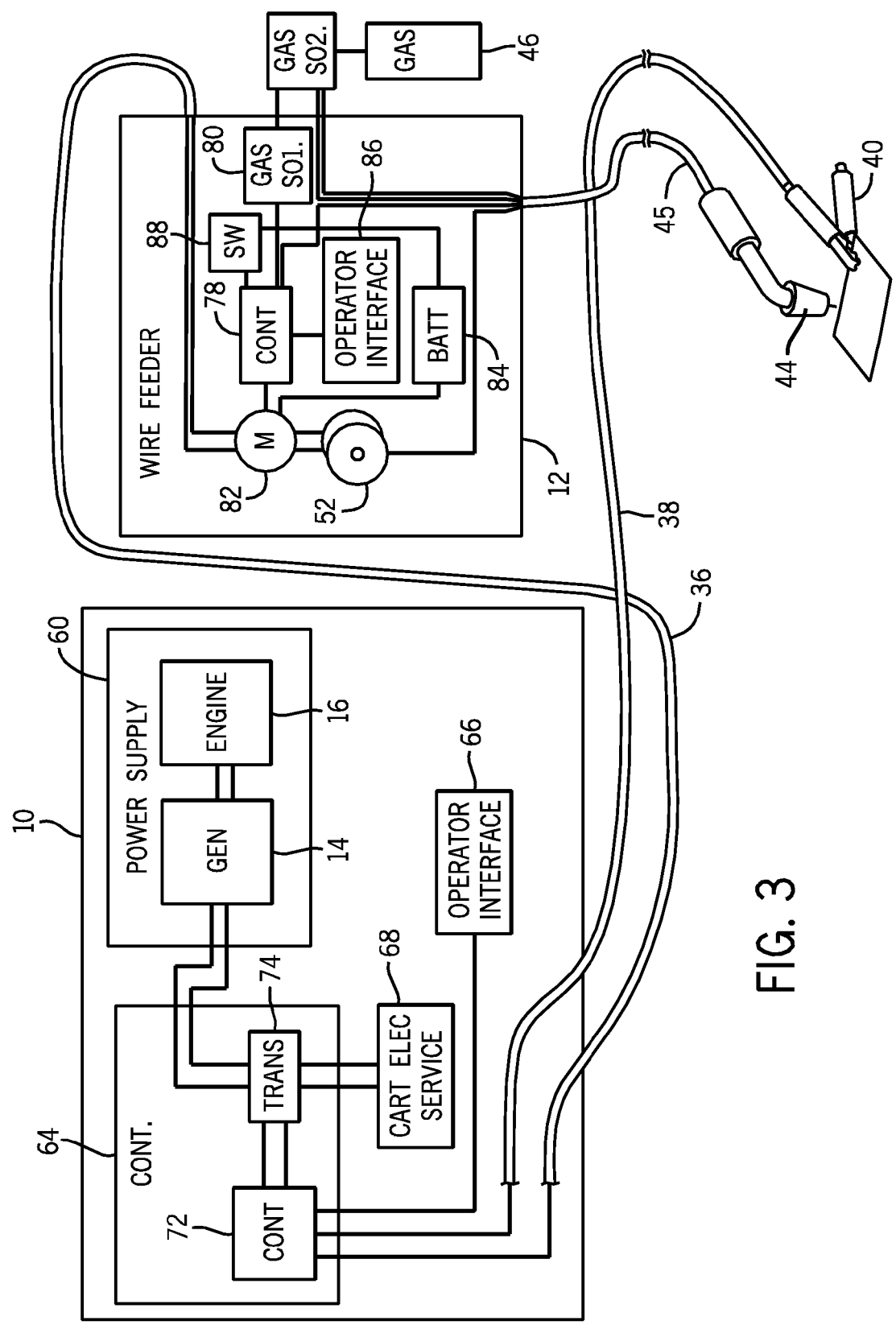
FIG. 3 is a block diagram of a universal wearable wire feeder coupled to a portable engine-driven welding system in accordance with an embodiment of the present invention.

FIG. 3 is a block diagram illustrating the portable power unit 10 and the wire feeder 12. For example, FIG. 3 illustrates various internal components of the portable power unit 10 are further illustrated, such as a power supply 60 that includes the engine 16 and generator 14, a controller circuit 64, an operator interface 66, and a cart electric service 68. The controller circuit 64 may include a converter 72 and a transformer 74. The wire feeder 12 may be coupled to the portable power unit 10 by the power cable 36, as discussed above, and may include a control circuit 78, a gas solenoid 80, a wire drive 82, the wire spool 52, a battery 84, and an operator interface 86.

Thus, in some embodiments the wire feeder 12 may consist essentially of the control circuit 78, the gas solenoid 80, the wire drive 82, the wire spool 52, and the operator interface 86. In another embodiment, the wire feeder 12 may consist essentially of the control circuit 78, the gas solenoid 80, the wire drive 82, the wire spool 52, the battery 84, and the operator interface 86. Further, in such embodiments, the wire feeder 12 is separate from both the power unit 10 and the torch 44.

The wire feeder 12 may receive power from the converter 72 of the portable power unit 10 and route the power to the torch 44. The wire feeder 12 also may use the received power to charge the battery 84 and/or power other internal components. The control circuit 78 of the wire feeder 12 may provide for control of various parameters of the wire feeder 12 and the welding operation. For example, the control circuit 78 may allow for control of the wire feed speed through control of the wire drive 82, control of the gas solenoid 80 to control the gas received from the gas cylinder 46, control of the voltage received from the portable power unit 10 and so forth. By further example, the control circuit 78 may include power conditioning circuitry, such as constable to circuitry, such that the wire feeder 12 is not dependent on any particular source of power. In an embodiment, a user may adjust the control circuit 78 via one of the controls 56 on the housing of the wire feeder 12. Additionally, the control circuit 78 of the wire feeder 12 may include a battery charging circuit to recharge the battery 84 from the power received from the portable power unit 10. The wire feeder 12 may also include a mechanical or electrical contact switch 88 to provide arc contactor control.

Turning now in more detail to the portable power unit 10, the controller circuit 64 may also include the transformer 72 to aid in adjusting the voltage supplied to various components. For example, the transformer 72 may adjust the voltage received from the power supply before output to the cart electrical service 68 and the receptacles 28 on the front of the system 10, so that power tools or other accessories may be coupled to the system 10. In an embodiment, the transformer may enable 120V and 240V power output.

Power from the generator 14 may be conditioned by the controller circuit 64 and the converter 72. Within the controller circuit 64, the electrical output of the generator may be provided to a rectifier, which produces rectified DC power. The rectified DC power is provided to the converter 72, which may include at least one energy storage device such as a capacitor for smoothing the ripple in the rectified signal to provide a DC bus. An alternative embodiment may use a DC generator instead of an AC generator and rectifier, or the rectifier may be part of the generator, or between the generator and the converter 72.

The converter 72 may also include an inverter and rectifier to convert the smoothed and rectified DC signal to a welding output (having an appropriate current and voltage). The converter 72 may be, for example, a series resonant converter that inverts the DC bus and an output rectifier to produce a DC welding current as the welding output. An AC output may also be used in an alternative embodiment. For example, the converter 72 may allow a user to select a welding current is selected by such that the converter 72 provides the desired current. Various control functions including a hot start and a protection system may also be provided in the circuit 64.

The portable power unit 10 illustrated in FIG. 3 may also include the operator interface 86, which may interface with the control panel 30 and associated switches, dials, and/or knobs for setting the various operational parameters of the system. For example, the operator interface 86 may allow for setting the type of welding operation to be performed (e.g., MIG), as well as currents or voltages desired and other welding operating parameters.

As discussed above, the wire feeder 12 may include the wire drive 82 that drives the wire spool 52 to advance welding wire to the torch 44. In certain embodiments, the wire drive 82 may include a pair of wire drive wheels impressively fit about the welding wire, wherein at least one of the wheels is driven by a motor. The wire drive 82 may be driven by constant voltage provided by the battery 58. Advantageously, the battery 58 provides a more constant voltage source to the wire drive 82 than the arc voltage received from the portable power unit 10. The welding wire, for MIG welding, is fed into the torch 44 along with one of two power conductors coupled to the converter. Another of the conductors is coupled to the ground cable 38 to complete the electrical circuit through the work piece 42. The gas cylinder 46 may provide an inert gas used for shielding of the weld, and the supply of gas may be controlled by operation of the gas solenoid 80 and the control circuit 78. Additionally, the wire feeder 12 may include a gas purge control feature to enable purging of the shielding gas. However, a gas supply may not be required for MIG welding applications utilizing a flux core welding wire.

Referring now in more detail the power cable 36, the power cable 36 may include a single or multi-conductor control cable and a heavy weld cable. To facilitate charging of the battery 84, the single or multi-conductor control cable may act as a charge pick up lead for the battery 84 and connect to the opposite polarity weld stud. Additionally, in some embodiments, the power cable 36 may include various types of output control capability, such as remote voltage control, contactor control, and DC or AC wire feed voltage, depending on the outputs available from the portable power unit 10. In one embodiment, for a power cable 36 of about 50 feet, the weld power line may be 3 gauge wire. In another embodiment, for a power cable 36 of about 30 feet, the weld power line may be 4 gauge wire. Additionally, in some embodiments the power cable 36 may include a work lead.

Advantageously, as discussed above, by including the control circuit on the wire feeder 12, the universal wearable wire feeder 12 may be able to use a variety of constant voltage power sources without requiring external gas, external contactor control, or external supplies and/or control. The battery 84 may provide the power for the wire drive 82, thus the wire feeder 12 need not rely on a potentially erratic arc voltage used from a constant voltage power source. Additionally, inclusion of the gas cylinder 46 increases the portability of the wire feeder 12, as an additional gas supply at the power unit 10 is not necessary for welding.

It should be noted that many of the components needed for welding operations may be included in a system of the type illustrated in FIG. 1 and described above. That is, the system may include a wire feeder (with any associated spool, motor drive, gearing and so forth) in a base unit and power supply. A system of this type is available commercially from Miller Electric Mfg. of Appleton, Wis., under the commercial designation Renegade. The presence of a wire feed control circuit, discussed above, is not, however, required for use of the wire feeder due to the presence of the wire feeder control circuitry in the wire feeder itself. However, redundant control circuits may be provided, particularly where the power supply itself has its own wire feeder. At the same time, it should be recognized that other systems may be utilized that provide, for example, a DC power source alone, with minimal controls. Moreover, such systems need not be engine driven, but may be driven by connections to the power grid or by batteries.

By using lightweight materials for the housing 54 of the wire feeder 12 and including smaller components, such as a smaller wire spool, the universal wearable feeder wire feeder 12 may be lighter, smaller, and less bulky than conventional wire feeders. Further, the portability of the portable power unit 10 and the length of power cable 36 may increase the range of the wearable wire feeder 12 and provide for welding in locations away from a power grid or in hard to reach areas. The short length of the welding torch 34 may provide the ability to reach welds in difficult or small areas and may permit aluminum welding.

Further, as mentioned above, the wearable wire feeder 12 may use smaller wire drive components due to the short distance between the wire feeder 12 and the torch 44. Similarly, the wearable feeder 12 can drive a smaller welding wire due to the shorter distance, and thus, the wire spool 52 may be smaller and lighter. Additionally, there is less distance to flow gas from the gas cylinder 46, and less welding wire and gas in the shorter cable 45. Because the controls 56 are included on the wire feeder 12, a user does not need to return to the power unit 10 to adjust the parameters of the welding operation.

Figure 4:
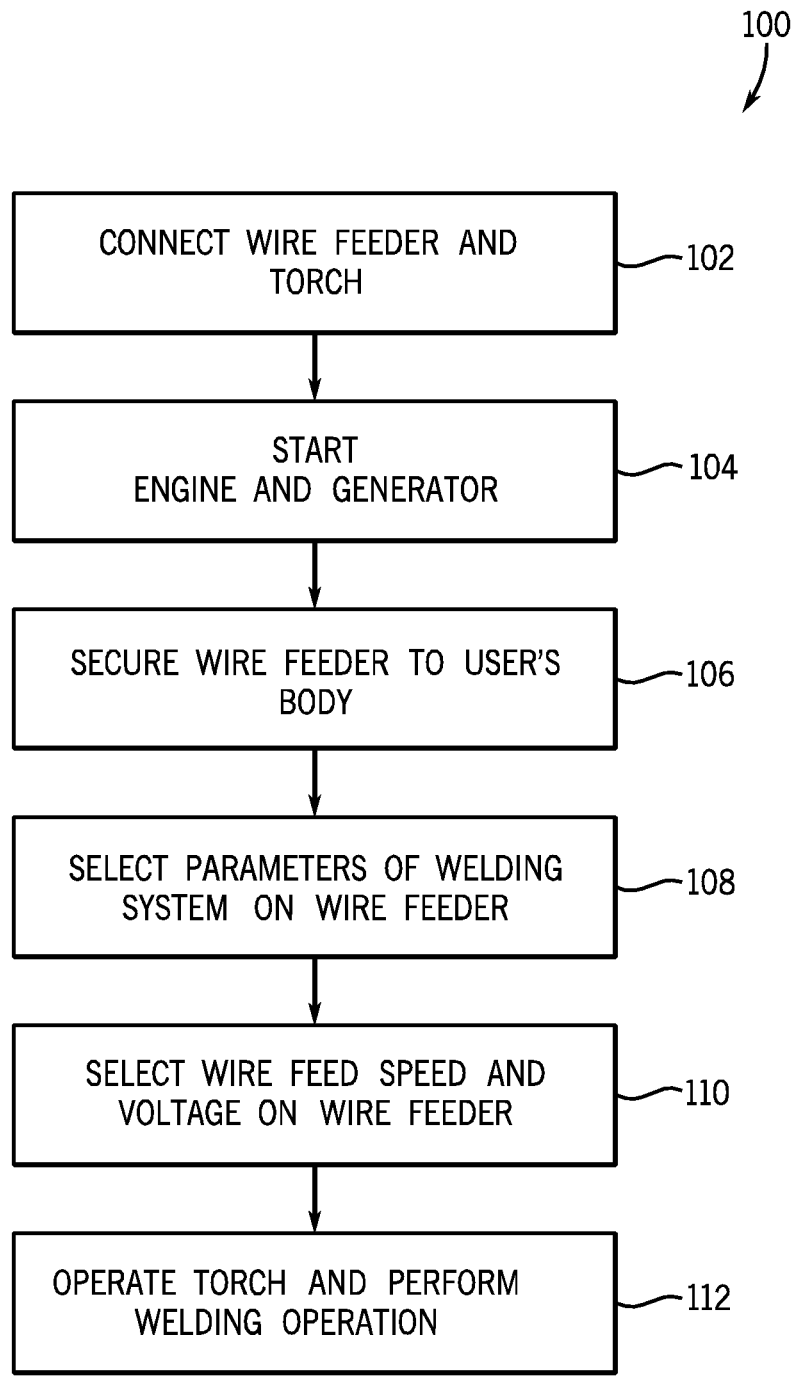
FIG. 4 illustrates a process for operating the universal wearable wire feeder coupled to a portable engine-driven welding system in accordance with an embodiment of the present invention.

FIG. 4 illustrates a process 100 for operating the portable power unit 10 and universal wearable wire feeder 12. Beginning with block 102, a user may first connect the wearable wire feeder 12 to the portable power unit 10, such as by power cable 36, and may connect the welding torch 44 to the wearable wire feeder 12. The user may also connect the ground clamp 40 to the work piece 42.

To generate power for the welding operation, the user may start the engine 16 and generator 14 of the system 10 (block 104). The user may then secure the wearable wire feeder 12 to the user's body to allow hands-free use of the wire feeder (block 106). It may be advantageous for the user to wear the wire feeder 12, such as by strapping the wire feeder 12 around the user's waist as a fanny pack or wearing the wire feeder 12 over the user's shoulder.

After power is available from the portable power unit 10, the user may then turn on and select the various operating parameters of the welding operation, such as voltage, gas, wire feed, etc (block 108), using the controls on the wire feeder 12. As stated above, the control circuit 78 of the wire feeder 12 allows selection of these various parameters from the wire feeder 12, without adjustment to the portable power unit 10. Thus, the wire feeder 12 may control the wire feed, gas supply, and welding power to the torch 44.

The user may select an appropriate wire feed speed using the controls 56 on the wearable wire feeder 12 (block 110), thus allowing the user to be remote from the portable power unit 10 when initiating or adjusting the welding process. For example, the rate of adjustment of the wire feed speed may be based on a setup parameter chart to maintain a selected target arc length and heat input at the weld. Further, by wearing the wire feeder 12 and freeing both hands, the user may be able to use both hands for support, movement, and adjustment of the wire feeder 12 and operation of the torch 44. Once all adjustments have been made to the user's preferences, the user may operate the torch 44 by depressing a trigger or other switch on the torch 44 and then performing the welding operation (block 112).

While the embodiments of the invention were described above in the context of MIG welding torches and to MIG welding in general, it should be borne in mind that embodiments of the present invention, while including a wire feeder 12 for performing MIG welding operations, is not necessarily limited to such operations.

In summary, the system described above allows for a base unit, containing a power supply, to be easily coupled to welding components, including a remote wire feeder, a welding torch, and a short run of cable between the wire feeder and welding torch. The remote wire feeder is coupled to the power supply by a longer run of cable that provides welding power to the wire feeder. Control circuitry for generating the wire feed signals is provided in the wire feeder itself, eliminating a need for separate circuitry in the power supply or base unit. The remote wire feeder may be a simple as a motor, any needed drive linkages, a spool of welding wire and the wire feed control circuit card. A trigger on the welding torch causes a signal to be sent to the control circuitry that, in turn, causes the wire feeder to drive wire to the torch. On the other hand, certain controls, such as wire feed speed, voltage, and so forth, may be provided on the remote wire feeder. These may be controlled by the user via dials, knobs, buttons or any other control input interface. In many or most applications, the wire feeder will be designed to be worn such that the welder may conveniently work without the need to more, carry, or drag the wire feeder between welding locations.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system comprising:
   a wearable wire feeder, comprising:
   a wire drive;
   a control unit configured to control the wire drive; and
   a gas control configured to control flow of a gas; and
   a gas source.

2. The system of claim 1, wherein the wearable wire feeder comprises the gas source.

3. The system of claim 1, wherein the gas source comprises a carbon dioxide recipient.

4. A method comprising:
   generating a control signal within a wearable wire feeder;
   driving a welding wire within the wearable wire feeder in response to the control signal; and
   delivering a shielding gas to a welding torch from a gas supply mounted on the wearable wire feeder or an operator.

5. The method of claim 4, wherein generating comprises controlling a wire drive within the wearable wire feeder without external control.

6. The method of claim 4, wherein driving the welding wire comprises receiving the welding wire from a spool within the wearable wire feeder and delivering the welding wire to a welding gun outside of the wearable wire feeder.

7. The method of claim 4, comprising channeling the welding wire from the wearable wire feeder at a waist of an operator to a welding gun in hand of the operator.

* * * * *